United States Patent [19]

Ravnikar

[11] 4,211,268
[45] Jul. 8, 1980

[54] WHEEL

[76] Inventor: Borut Ravnikar, Pod Topoli 19, Ljubljana, Yugoslavia

[21] Appl. No.: 901,118

[22] Filed: Apr. 28, 1978

[51] Int. Cl.² .............................................. B60B 9/28
[52] U.S. Cl. ........................................... 152/5; 152/7; 152/12; 152/16; 152/44; 104/281
[58] Field of Search .................... 152/1, 5–17, 152/40, 44, 51, 53, 55, 87, 97, 99, 103, 104, 105; 104/23 FS, 148 MS

[56] References Cited

U.S. PATENT DOCUMENTS

| 1,092,029 | 3/1914 | Dodge | 152/1 |
| 1,094,956 | 4/1914 | Wickman | 152/7 |
| 1,195,148 | 8/1916 | Newman | 152/55 |
| 1,345,827 | 7/1920 | Bohannon | 152/12 |
| 1,457,538 | 6/1923 | Mark et al. | 152/51 |
| 1,812,827 | 6/1931 | Gannett | 280/47.21 |
| 2,528,156 | 10/1950 | Maiorca | 152/44 X |
| 3,773,388 | 11/1973 | Gorzell | 301/5 R |
| 3,789,947 | 2/1974 | Blumrich | 180/79.3 |
| 3,794,384 | 2/1974 | Rice | 301/5 R |
| 3,802,743 | 4/1974 | Hermanns | 301/5 R |
| 3,876,255 | 11/1975 | Ilon | 301/5 P |
| 3,951,075 | 4/1976 | Miericke et al. | 104/148 MS |

FOREIGN PATENT DOCUMENTS

| 352611 | 8/1905 | France | 152/DIG. 5 |
| 372719 | of 1906 | France | 152/6 |
| 384261 | of 1908 | France | 152/44 |

Primary Examiner—John J. Love
Assistant Examiner—D. W. Underwood
Attorney, Agent, or Firm—Daniel Jay Tick

[57] ABSTRACT

A wheel has a plurality of variable length spokes extending radially from the hub to the rim and supporting the rim coaxially around the hub. Spoke length varying devices vary the lengths of the spokes.

1 Claim, 9 Drawing Figures

U.S. Patent  Jul. 8, 1980  4,211,268
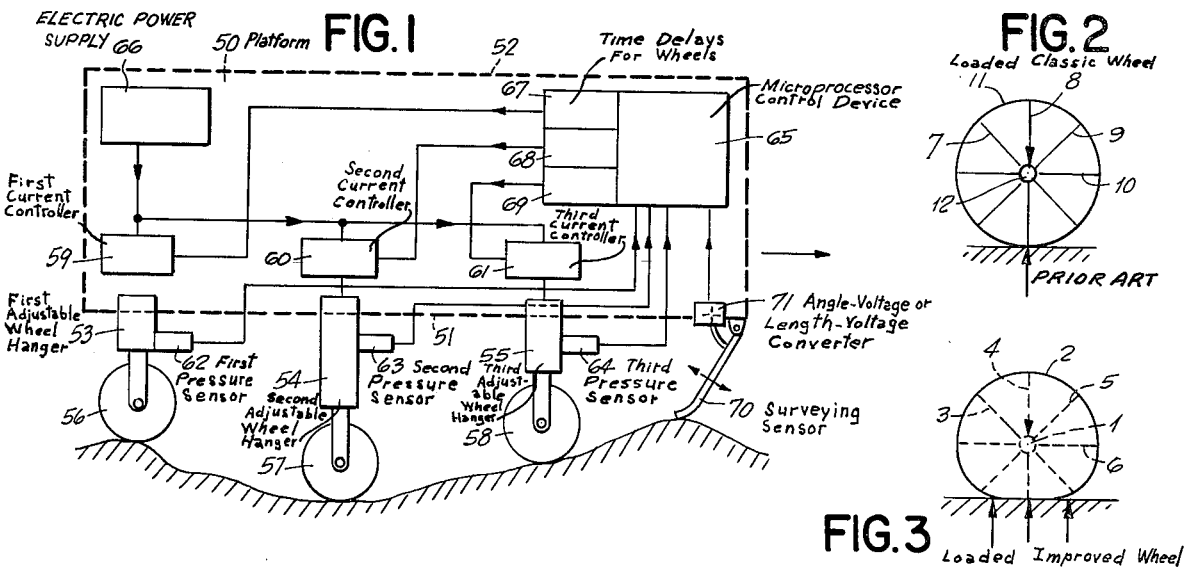
FIG. 1
FIG. 2
FIG. 3
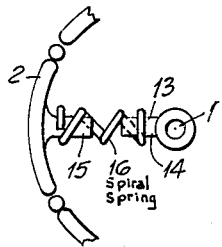
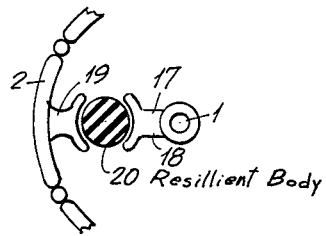
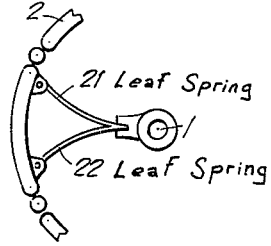
FIG. 4
FIG. 5
FIG. 6
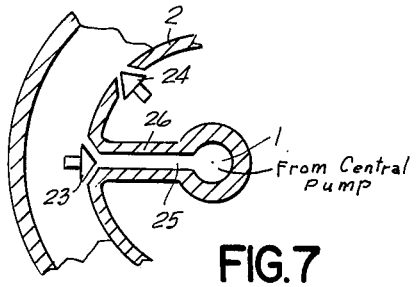
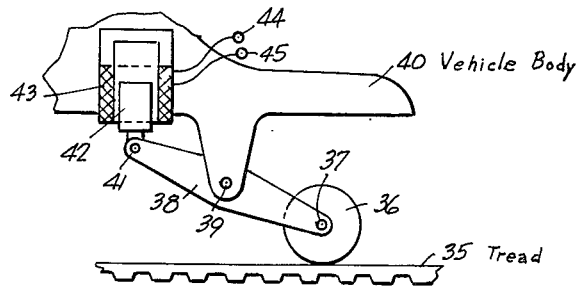
FIG. 7
FIG. 9
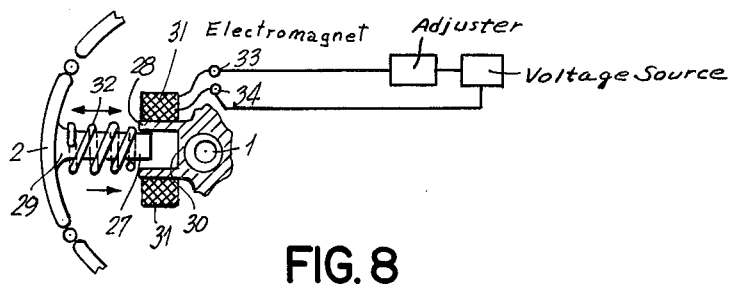
FIG. 8

WHEEL

BACKGROUND OF THE INVENTION

The present invention relates to a wheel. More particularly, the invention relates to a wheel having a hub and a rim encircling the hub and spaced therefrom by spokes.

Wheels are disclosed in U.S. Pat. Nos. 1,812,827; 3,773,388; 3,789,947; 3,794,384; 3,802,743 and 3,876,255.

Objects of the invention are to provide a wheel of simple structure, having controlled variable length spokes, so that it functions efficiently, effectively and reliably to more efficiently distribute the force applied thereto as it rolls over uneven terrain.

BRIEF DESCRIPTION OF THE DRAWINGS

In order that the invention may be readily carried into effect, it will now be described with reference to the accompanying drawings, wherein:

FIG. 1 is a block diagram of an embodiment of a rough terrain vehicle utilizing the wheel of the invention;

FIG. 2 is a schematic diagram of a classic wheel in loaded condition;

FIG. 3 is a schematic diagram of the wheel of the invention in loaded condition;

FIG. 4 is a view of part of a first embodiment of the wheel of the invention;

FIG. 5 is a view, partly in section, of a second embodiment of the wheel of the invention;

FIG. 6 is a view of part of a third embodiment of the wheel of the invention;

FIG. 7 is a cross-sectional schematic diagram of part of a fourth embodiment of the wheel of the invention;

FIG. 8 is a view, partly in section, of part of a fifth embodiment of the wheel of the invention; and FIG. 9 is a schematic diagram of a wheel mount for a tractor vehicle, in accordance with the principles of the invention.

DETAILED DESCRIPTION OF THE INVENTION

The wheel of the invention has a hub 1 and a rim 2 encircling the hub and spaced therefrom, as shown in FIGS. 3 to 8.

The wheel of the invention comprises a plurality of controlled variable length spokes 3, 4, 5, 6, and so on, extending radially from the hub 1 to the rim 2 and supporting said rim coaxially around said hub, as shown in FIG. 3.

The classic wheel, as is commonly known, has fixed radial spokes 7, 8, 9, 10, and so on, coaxially supporting the rim 11 around the hub 12, as shown in FIG. 2. The variable spokes of the wheel of the invention permit a more even distribution of forces on the loaded wheel and among loaded wheels of a vehicle, as shown by the arrows in FIG. 3, than in the classic wheel, as indicated by the arrows in FIG. 2. The distribution of forces results in a smoother movement over rough terrain and permits the levelling of the vehicle relative to the ground.

In accordance with the invention, spoke length varying devices are provided for varying the lengths of the spokes 3 to 6, and so on. The various embodiments illustrated in FIGS. 4 to 8 show different spoke length varying devices.

In the interest of clarity of illustration, only a single spoke and a single spoke length varying device is disclosed and described for each of the five illustrated embodiments of the wheel of the invention.

In the first embodiment, of FIG. 4, the spoke 13 is divided into two aligned parts 14 and 15 spaced from each other. The spoke length varying device comprises a spiral spring 16 coupled to, and extending between, the parts 14 and 15 in alignment with said parts. The length of the spoke 13 thus varies with the compression and tension of the spring 16.

In the second embodiment, of FIG. 5, the spoke 17 is divided into two aligned parts 18 and 19 spaced from each other. The spoke length varying device comprises a body of resilient material 20 coupled to, and extending between, the parts 18 and 19 in alignment therewith. The resilient material 20 may comprise any suitable resilient material such as, for example, rubber, and may be in any suitable shape such as, for example, a spherical or cylindrical shape. The length of the spoke 17 thus varies with the compression and tension of the resilient body 20.

In the third embodiment, of FIG. 6, the spoke length varying device comprises a pair of leaf springs 21 and 22. The leaf springs 21 and 22 are joined to each other at the hub 1 and are spaced from each other at the rim 2. The length of the spoke consisting of the pair of leaf springs 21 and 22 is varied in accordance with the compression of said springs, which results in convergence or divergence from each other of the ends affixed to the rim 2.

In the fourth embodiment, of FIG. 7, the rim 2 comprises a toroidal configuration of resilient material such as, for example, rubber, and fluid such as, for example, air, gas or liquid, therein. The rim 2 thus closely resembles a tire. The spoke length varying device comprises a fluid control system, including an inlet valve 23, an outlet valve 24 and a fluid supply duct 25 extending from the hollow rim 1 to the toroidal configuration. The fluid is supplied via a central pump, through the hub 1. The length of the spoke 26 is thus varied by varying the pressure in the toroid, which, in turn, is achieved by variation of the fluid supplied thereto and removed therefrom.

In the fifth embodiment, of FIG. 8, the spoke 27 is divided into two aligned parts 28 and 29 of ferromagnetic material with small remnant magnetism spaced from each other. The spoke length varying device comprises a cup 30 formed in the first part 28 for accommodating the second part 29. An electromagnet 31 has a coil coaxially positioned around the cup 30. A spiral or similar-shaped spring 32 is coaxially mounted around the second part 29. The length of the spoke 27 is thus varied by variation of the current supplied to the electromagnet via its terminals 33 and 34, since the flow of current through said electromagnet results in a variation of the magnetic field thereby varying the attraction of the second part 29 of said spoke to said electromagnet. This results in a variation of the distance of the second part 29 of the spoke 27 from the electromagnet 31.

FIG. 9 illustrates the application of the basic principle of the invention to a tractor vehicle such as, for example, a tank, having a tread 35. In the application of FIG. 9, a wheel 36 is mounted at one end 37 of an arm 38 which is pivotally affixed at its center 39 to the vehicle body 40. The opposite end 41 of the arm 38 bears a piston 42 of magnetic material which is coaxially positioned in an annular electromagnet 43 carried by the body of the vehicle 40. The wheel 36 is thus varied in position, as a whole, in accordance with the intensity of electric current supplied to the electromagnet 43 via its terminals 44 and 45, since the intensity of the current varies the magnetic field produced by said electromagnet and thereby varies the position of the piston 42. This results in a variation of the position of the wheel 36 due to the ensuing pivotal motion of the arm 38 about its center 39.

FIG. 1 is a block diagram of an embodiment of a rough terrain vehicle. The rough terrain vehicle of FIG. 1 has a platform 50, indicated by broken lines in FIG. 1, and having an undersurface 51 and an oversurface 52.

A plurality of variable length wheel supports or wheel hangers 53, 54, 55, and so on, extend from the undersurface 51 of the platform 50. The wheel supports 53, 54, 55 and so on, are variable or adjustable in length. A plurality of wheels 56, 57, 58, and so on, are rotatably mounted at the free ends of the wheel supports 53, 54, 55, and so on, respectively.

A plurality of wheel support length varying devices are provided, each in operative proximity with a corresponding one of the wheel supports 53, 54, 55, and so on. Each of the wheel support length varying devices comprises an electromagnet (not shown in the FIGS.) in operative proximity with a wheel support member which is mounted for free movement in directions of its axis. Each of the wheels 56, 57, 58, and so on, is mounted at the free end of the wheel support member. The length of each of the wheel supports 53, 54, 55, and so on, is varied by controlling the magnetic fields produced by the electromagnets. This is accomplished by a first current controller 59 electrically connected to the electromagnet controlling the first adjustable wheel support 53, a second current controller 60 electrically connected to the second wheel support 54, a third current controller 61 electrically connected to the electromagnet of the third adjustable wheel support 55, and so on.

A plurality of pressure sensors 62, 63, 64, and so on, are provided in operative proximity with the wheel supports 53, 54, 55, and so on, respectively.

A microprocessor control device or computer 65 carried by the platform 50 is coupled to the plurality of wheel support length varying devices, and more specifically, to the current controllers 59, 60, 61, and so on, and to the plurality of pressure sensors 62, 63, 64, and so on. The control device or computer 65 controls the operation of the wheel support length varying devices to vary the lengths of the wheel supports 53, 54, 55, and so on, in accordance with the pressures sensed by the pressure sensors 62, 63, 64, and so on.

An electrical power supply 66 of any suitable type such as, for example, a bank of batteries of any suitable type, is electrically connected to each of the current controllers 59, 60, 61, and so on. The computer 65 is connected to each of the current controllers 59, 60, 61, and so on, via time delays 67, 68, 69, and so on, each of the time delays being electrically connected to a corresponding one of the current controllers 59, 60, 61, and so on, respectively.

The output signals of each of the pressure sensors 62, 63, 64, and so on, are supplied to the computer 65 as input data, and said computer controls the positions of the adjustable wheel supports 53, 54, 55, and so on, in accordance with the input data fed thereto.

A surveying sensor 70 is movably affixed to, and extends from, the undersurface 51 of the platform. An angle-voltage or length-voltage converter 71 is carried by the platform 50 and coupled to the surveying sensor 70. The converter 71 is also coupled, or, more specifically, electrically connected, to the computer 65 for converting movement of the sensor 70, due to length and angle, to system parameters to assist in varying the length of the wheel supports 53, 54, 55, and so on, so that said converter 70 functions to supply additional critical data to the computer in order to control the positions of said adjustable wheel supports.

While the invention has been described by means of a specific example and in a specific embodiment, I do not wish to be limited thereto, for obvious modifications will occur to those skilled in the art without departing from the spirit and scope of the invention.

I claim:

1. A wheel having a hub and a rim encircling the hub and spaced therefrom, said wheel comprising a plurality of controlled variable length spokes extending radially from the hub to the rim and supporting said rim coaxially around said hub, each of the spokes being divided into two aligned parts of ferromagnetic material spaced from each other; and spoke length varying means for varying the lengths of the spokes by electromagnetic force, said spoke varying means comprising a cup formed in a first of the parts for accommodating the second of the parts, an electromagnet having a coil coaxially positioned around said cup and a spring coaxially mounted around the second of the parts.

* * * * *